United States Patent
Bocci et al.

(10) Patent No.: US 9,497,093 B2
(45) Date of Patent: Nov. 15, 2016

(54) RELIABLE STATUS DELIVERY AND REQUEST MECHANISM FOR STATIC PSEUDOWIRES

(71) Applicant: ALCATEL-LUCENT, Paris (FR)

(72) Inventors: Matthew Bocci, London (GB); Paul Kwok, Sunnyvale, CA (US); Shafiq Pirbhai, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 135 days.

(21) Appl. No.: 14/035,435

(22) Filed: Sep. 24, 2013

(65) Prior Publication Data

US 2015/0085705 A1    Mar. 26, 2015

(51) Int. Cl.
*H04L 1/18*      (2006.01)
*H04L 12/26*     (2006.01)

(52) U.S. Cl.
CPC ......... *H04L 43/0817* (2013.01); *H04L 1/1883* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 6,781,982 | B1 * | 8/2004 | Borella et al. | 370/352 |
| 7,277,399 | B1 * | 10/2007 | Hughes, Jr. | 370/252 |
| 7,869,350 | B1 * | 1/2011 | Bryant et al. | 370/228 |
| 7,940,695 | B1 * | 5/2011 | Bahadur et al. | 370/254 |
| 2006/0182113 | A1 * | 8/2006 | Liang et al. | 370/395.3 |
| 2007/0127380 | A1 * | 6/2007 | Abraham et al. | 370/235 |
| 2010/0169718 | A1 | 7/2010 | Tausanovitch | |

FOREIGN PATENT DOCUMENTS

| | | |
|---|---|---|
| EP | 1 978 681 | 10/2008 |
| EP | 2 209 283 A1 | 7/2010 |

OTHER PUBLICATIONS

Martini, et al., "Psuedowire Status for Static Pseudowires", Internet Engineering Task Force (IETF) Request for Comments: 6478; Updates: 5885, Alcatel-Lucent, May 2012, 1-13 [http://tools.ietf.org/html/rfc6478 (viewed Sep. 24, 2013)].
Notification of Transmittal of the International Search Report and the Written Opinion of the International Searching Authority, or the Declaration for PCT/IB2014/002114 dated Mar. 10, 2015.
Martini, et al., MPLS LSP PW Status Refresh Reduction for Status Pseudowires, Feb. 21, 2013, 1-17.

* cited by examiner

*Primary Examiner* — Alex Skripnikov
(74) *Attorney, Agent, or Firm* — Kramer & Amado, P.C.

(57) ABSTRACT

Various exemplary embodiments relate to a method for determining peer status in a pseudowire (PW) node, the method including: sending a first PW status request message to a peer node including a PW node local message ID, PW node remote message ID, and request flag; starting a first retry timer; starting a second retry timer when the first retry timer expires and no response to the first PW status request message is received; starting a first request timer when the second retry timer expires and no response to the first PW status request message is received; and starting a third retry timer when the first request timer expires and no response to the first PW status request message is received.

16 Claims, 3 Drawing Sheets

RELIABLE STATUS DELIVERY AND REQUEST MECHANISM FOR STATIC PSEUDOWIRES

TECHNICAL FIELD

Various exemplary embodiments disclosed herein relate generally to communication over pseudowires.

BACKGROUND

FIG. 1 illustrates the basic concept of a pseudowire (PW) in a communication network. In the network 100, pseudowires 105a-b are defined to run over a packet network 115, such as, IP networks, layer two tunneling protocol (L2TP) networks, MPLS networks, etc. These networks provide the packet "cloud" 115 through which connection-oriented tunnels 110 are formed to support pseudowires 105a-b. For the common MPLS case, two unidirectional, inner-tunnel, label-switched paths (LSPs) are contained within unidirectional, outer-tunnel LSPs (which act as traffic-engineering tunnels) and create a bidirectional connection between provider edge (PE) routers.

The inner LSPs form the pseudowires 105a-b by using an interworking function (IWF)—currently residing at the PE, although it can easily and rapidly migrate to the customer equipment (CE)—that encapsulates the CE data transmission format, such as frame relay, asynchronous transfer mode (ATM), or Ethernet, from the attachment circuit into a standard packetized pseudowire format. At the far end of the pseudowire 105a-b, the data is unencapsulated and handed over to the destination CE.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for determining peer status in a pseudowire (PW) node, the method including: sending a first PW status request message to a peer node including a PW node local message ID, PW node remote message ID, and request flag; starting a first retry timer; starting a second retry timer when the first retry timer expires and no response to the first PW status request message is received; starting a first request timer when the second retry timer expires and no response to the first PW status request message is received; and starting a third retry timer when the first request timer expires and no response to the first PW status request message is received.

Various exemplary embodiments relate to a method for determining peer status in a pseudowire (PW) node, the method including: receiving a first PW status request message from a peer node including a peer node local message ID, peer node remote message ID, and request flag; setting a PW remote message ID to the peer node local message ID; sending a second PW status request message to the peer node, if requested by the peer node, including the PW node local message ID, PW node remote message ID, and request flag; and starting a first request timer.

Various exemplary embodiments relate to a pseudowire (PW) node including: a network interface; a memory; and a processor in communication with the memory, the processor being configured to: send a first PW status request message to a peer node including a PW node local message ID, PW node remote message ID, and request flag; start a first retry timer; start a second retry timer when the first retry timer expires and no response to the first PW status request message is received; start a first request timer when the second retry timer expires and no response to the first PW status request message is received; and start a third retry timer when the first request timer expires and no response to the first PW status request message is received.

BRIEF DESCRIPTION OF THE DRAWINGS

In order to better understand various exemplary embodiments, reference is made to the accompanying drawings, wherein.

To facilitate understanding, identical reference numerals have been used in the Figures and the text to designate elements having substantially the same or similar structure or substantially the same or similar function.

Figure 1:
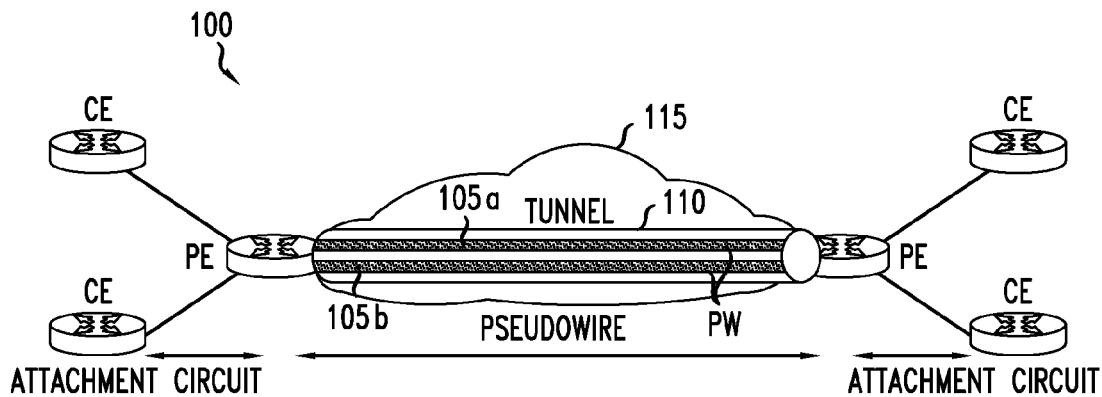
FIG. 1 illustrates the basic concept of a pseudowire (PW) in a communication network.

Herein, various embodiments are described more fully by the Figures and the Detailed Description. Nevertheless, the inventions may be embodied in various forms and are not limited to the specific embodiments that are described in the Figures and Detailed Description.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

RFC6478 describes a standard mechanism for advertising the status of a pseudowire (PW) that is not controlled by a label distribution protocol (LDP) session. Such a pseudowire has labels that are manually configured by the operator and is termed a static pseudowire. This solution may involve sending a packet in-band containing a bit field representing the status of the PW along an associated control channel on the PW between a sending PE node and a receiving PE node. The status message may be periodically refreshed at a refresh timer interval.

However, this mechanism does not ensure that the receiving node actually receives the status message. Further, a sending node is unable to determine if the receiving node actually received a specific status message. Also, a sending node is unable to determine reliably if the status that it currently holds for a PW is inaccurate or if it is stale. Further, when a PW is newly configured (either during execution of configuration file on boot up or when it is later provisioned), there is no way defined in the RFC to send a request for the peer's PW status. Also, the RFC specifies the default PW status bits indicate a status of "no faults" until a refresh message is received from peer node containing the peer PW status. Also, the RFC specifies that if the PW status bits expire, then they will be set to the default value of "no faults."

There remains a need for a PW control channel status request mechanism so that a peer that has stale PW status for the far-end of a PW can request that the peer node send a PW status update. Accurate and current information about the far end status of a PW is required for proper operation of various types of PW operation, for example, a redundant PW configuration. This mechanism may ensure that a consistent view of the control plane is maintained, as far as possible, between peer nodes.

The following types of problems may occur in the current PW operation. The PW refresh timer is either disabled, or set to a long interval, so a node does not know if it's currently held status is still valid. RFC6478 specifies that if the peer refresh timer times out, a status of 0, i.e., no defect, should be assumed, unless some other defect detection, mechanism indicates that the PW is down. If no other defect detection mechanism is used, then the status of 0 for the PW may not be accurate. Also, the current mechanism may generate too many packets on a status change, which may cause control plane congestion in a downstream node.

Figure 2:
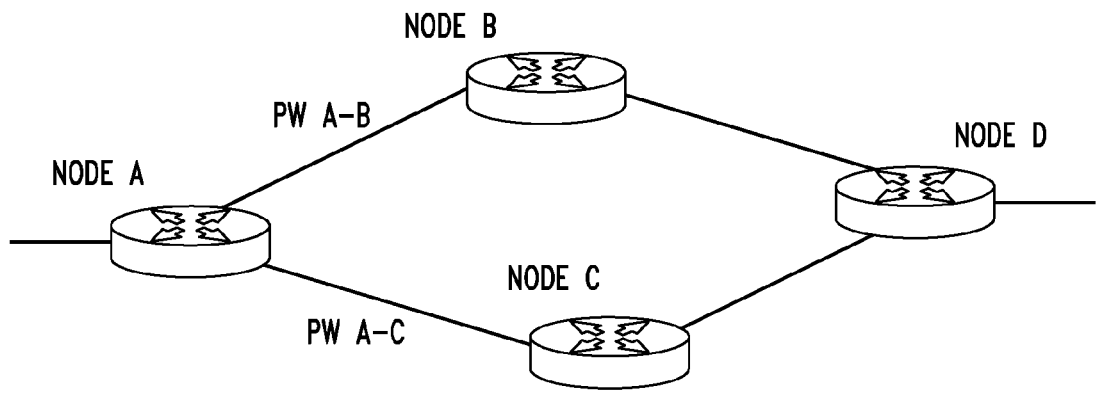
FIG. 2 illustrates the problem of loops in a pseudowire network.

Another type of problem occurs if a node has just rebooted, and the rebooted node does not hold status for the far end node of the PW. This may cause loops in the forwarding path for broadcast traffic. FIG. 2 illustrates the problem of loops in a pseudowire network. The PW network 200 includes four nodes: Node A, Node B, Node C, and Node D. Node A communicates with Node B using a pseudowire PW A-B. Node A also communicates with Node C using a pseudowire PW A-C. Node B connects with Node D using any type of communication. Likewise, Node C connects to Node D using any type of communication. In the PW network 200, PW A-B and PW A-C provide redundant communication paths between Node A and Node D. In this example, Node A selects PW A-B to be active and to provide the primary communication path between Node A and Node D. Node A selects PW A-C to be in standby. If PW A-B becomes unavailable, Node A may divert traffic to Node D through Node C. As discussed above a loop back problem may occur if Node C needs to restart. According the current PW operation defined in the RFC, upon start up, Node C will assume that it is active and establish connections with both Node A and Node D. Now Node D will send traffic for Node A to Node C which will then forward it to Node A. But because, node A has selected PW A-B to be active and PW A-C to be in standby it will ignore the traffic from Node C which includes the traffic from Node. D. Hence, a loop back situation occurs because the nodes at the end of the PWs cannot determine the status of its peer node. A peer node is another node connected to the other end of a PW from the local node.

The problems described above may be overcome by including an identifier for the message from the sending node in the PW status message between a pair of nodes. Further, the PW status message from the sending node may include a flag or some other indicator to request that the receiver acknowledge receipt of that specific status message and to request that the receiving node include an update of the status of the PW from its local perspective.

The sending node may thus determine if a receiving node has actually received the status message and the receiving node's view of the PW status. If an acknowledgement for the status message is not received, then the sending node may continue to send status messages on the PW associated control channel until the acknowledgement is received. If an acknowledgement is not received within a certain interval of the first status message being sent, then the sending node may declare that the PW as down so as to prevent blackholing of traffic on the PW.

An embodiment of a PW system using a PW status message including a request for a return PW status report is now described. The use of the request for a return status feature may be enabled when a RetryTimer parameter is non-zero. When enabled, the normal RFC6478 refresh timer behavior is overridden. The refresh timer value in the status packet defined in RFC6478 is typically set to zero which indicates that PW status message will never be refreshed. In such a situation the request for a return status feature may be used.

In extending the PW protocol to allow for a request for a return PW status report, the following parameters may be defined: RetryTimer; RequestTimer; and TimeoutMultiplier. The RetryTimer parameter determines the interval at which PW status messages, including a reliable delivery type, length, value pair (TLV) with the request bit set (see below) are sent. The RetryTimer may not be enabled if refresh timer≠0. The RequestTimer parameter determines the timeout interval if no response to a PW status request message is received. The RequestTimer defaults to 0 when no RequestTimer is specified. The TimeoutMultiplier parameter is used to determine if a peer node is down. If a requesting node does not hear back from a peer node after RequestTimer*TimeoutMultiplier, then it may assume that the peer is down. The TimeoutMultiplier defaults to 0 when no RequestTimer is present.

In extending the PW protocol to allow for a request for a return PW status report, the following protocol states may be defined: UnknownSleeping; UnknownRequesting; AcitveSleeping; and AcitveRequesting. Further, the extended PW protocol may include the following parameters (which will be further described below): Local Message ID (LocalID); Remote Message ID (RemodeID); and Last Request ID (LastReqID).

When the local node is in the UnknownSleeping state, the local node does not know the peer's view of the PW status, and is not actively trying to find it out. The local node is waiting for the RetryTimer timer to expire before attempting to obtain a peers's status. In this state, the RetryTimer is running, RemoteID=0, and the peer's status code is forced to be not-forwarding.

When the local node is in the UnknownRequesting state, the local node does not know the peer's view of the PW status, but is actively trying to determine it. The local node has sent a PW status request message to its peer and is waiting for an acceptable response. In this state, the Retry- Timer timeout timer is running, the RequestTimer timer is running, RemoteID=0, and peer's status code is forced to be not-forwarding.

When the local node is in the AcitveSleeping state, the local node does know the peer's view of the PW status, and is waiting for the for the RetryTimer timer to expire before requesting a refresh of the peer with its status values. In this state, the RetryTimer-timer is running, RemoteID=the ID that was last sent by the peer, and the peer's status code is the status code that was last sent by the peer.

When the local node is AcitveRequesting state, the local node does know the peer's view of the PW status, and is actively trying to get a refresh of the peer's view of the PW status, having sent a PW status request message to the peer and is waiting for an acceptable response. In this state, the RetryTimer timeout timer is running, RequestTimer is running, RemoteID=the ID that was last sent by the peer, and the peer's status code is what was last sent by the peer.

Figure 3:
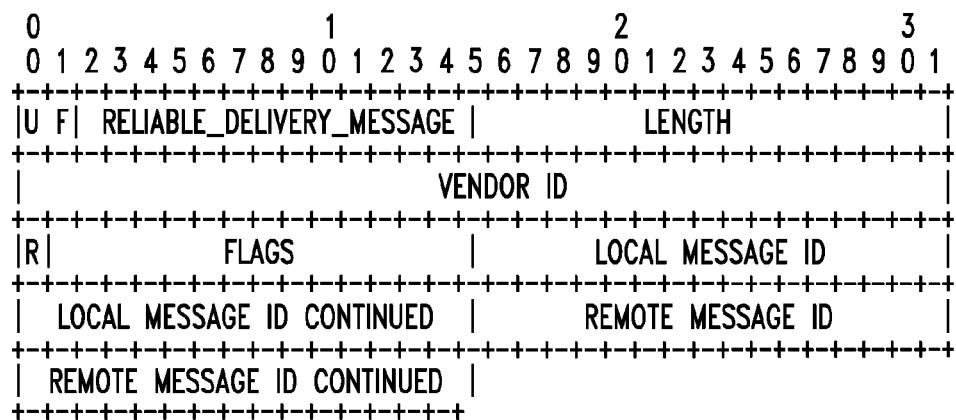
FIG. 3 illustrates an embodiment of a data arrangement for a Reliable_Delivery_Message TLV in the PW status request message.

FIG. 3 illustrates an embodiment of a data arrangement for a Reliable_Delivery_Message TLV in the PW status request message. The PW status request message uses a Reliable_Delivery_Message TLV carried in the static PW status message to ensure reliable delivery of a request message to a peer. This TLV may be carried in addition to the existing RFC6478 status TLV. The 'UF' field may be set to 10, to indicate that if a receiving node does not understand the TLV, it should ignore it and should not forward it. The R-bit (Req) indicates that the sending node is requesting the status of a peer node. Req may be set to 1 or T to indicate a request that a peer send a static PW status update. The R-bit may be set to 0 or F to indicate that the Reliable_Delivery_Message TLV contained in the packet is a response to a PW status request message. The Flags field is set to zero. This is shown in the TLV structure for future extensibility. Local Message ID (LocalID) may be 32 bit number indicating the ending node's current message ID. The LocalID value may be incremented when a PW status request message is sent and the status of the PW status message changes. Remote Message ID (RemoteID) is a 32 bit number indicating sending node's known value of the remote nodes LocalID. A RemoteID of 0 may indicate that the value is unknown.

When a PW node starts, the PW node may be placed in the UnknownSleeping state. The LocalID may be set to a random initial value. The LastReqID and RemoteID may be set to 0. The RequestTimer may be set to an initial value between 0 and the configured value. In future iterations the RequestTimer, it will be set to the configured value. This may prevent bursting.

The operation of a sending node using a PW status request message will now be described. When the RequestTimer expires the receiving node may go into an UnknownRequesting state if the status of the PW is unknown or into the ActiveRequesting state if the status of the PW is known.

The sending node may send a PW status request message with the Req flag set to T to indicate a request for status at the receiving node and the current LocalID value. Also the RetryTimer timeout timer may be started. The LastReqID may be set to the LocalID that was sent to the receiving node. If the RetryTimer timer expires, repeat sending a PW status request message. If the sending node sends Timeout-Multiplier, or three in this case, PW status request messages and the RetryTimer expires three times without receiving a return PW status message from the receiving node, then the sending node may be put into the UnknownSleeping state and the RequestTimer may be started. Also values other than three may be used as TimeoutMultiplier, which is the number of times to send the PW status request message without a reply. When the RequestTimer Expires, the receiving node may restart and repeat the process by sending a PW status request message with the Req flag set to T.

If the sending node receives a status response message from the receiving node, the sending node may update its state to ActiveSleeping and set the value of RemoteID to the LocalID received from the transmitting node. Further, the RequestTimer may be restarted. In another embodiment, the RequestTimer may not be reset, but continue to run until it expires.

The operation of a receiving node receiving a PW status message with a Reliable_Delivery_Message TLV will now be described. When the receiving node receives a PW status message, it will use the status code as normal if it is in AcitveSleeping or AcitveRequesting state. The Reliable_Delivery_Message TLV may be processed as follows. First, the receiving node may store the received LocalID as the RemoteID. If Req is set to T in the received Reliable_Delivery_Message, then send a PW status message back to the sending node with Req set to F, i.e., no update request is requested back from the sending node. In another embodiment, Req may instead be set to T. This may be done if it is desired to verify the status of the sending node. If the RemoteID in the received Reliable_Delivery_Message TLV the matches LocalID or the LastReqID of the receiving node, the receiving node may go into the AcitveSleeping state. If a RetryTimer is active, then it is canceled, and a RequestTimer is started. If a RequestTimer is active, then it is canceled and restarted.

Figure 4:
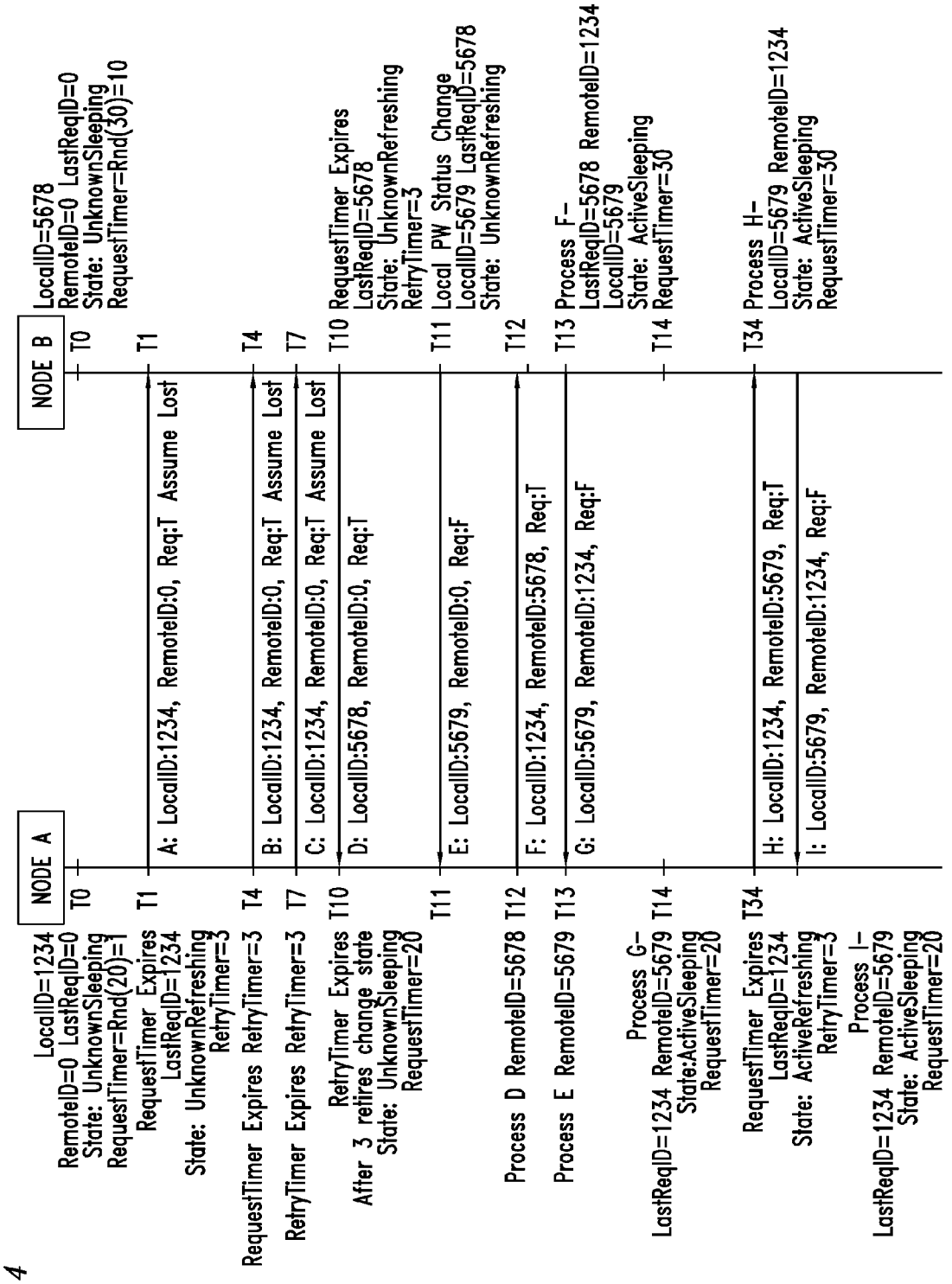
FIG. 4 illustrates an example message exchange between two nodes over a PW.

FIG. 4 illustrates an example message exchange between two nodes over a PW. At T0, Node A randomly sets LocalID to 1234. Node A also initializes RemoteID and LastReqID to 0. Node A is put in the UnknownSleeping state. The RequestTimer is initially randomly set to a value between 0 and 20, where 20 is its selected configured value. In this case, the initial RequestTimer is set to 1. The RequestTimer for Node A is also started.

At T0, Node B randomly sets LocalID=5678. Node B also initializes RemoteID and LastReqID to 0. Node B is put in the UnknownSleeping state. The RequestTimer is initially randomly set to a value between 0 and 30, where 30 is its selected configured value. In this case, the initial Request-Timer is set to 10. The RequestTimer for Node B is also started.

At T1, the RequestTimer for Node A expires. Node A sends PW status request message A including LocalID=1234, RemoteID=0, and Req=T. Node A also sets LastReqID=1234 and enters the UnknownRefreshing state. Also, the RetryTimer is set to 3 and started. In this example the PW status message is lost. The value that of the Retry timer can be values other then 3, which is just used as an example herein.

At T4, the RetryTimer for Node A expires. Node A sends PW status request message B including LocalID=1234, RemoteID=0, and Req=T. Also, the RetryTimer is set to 3 and started. In this example the PW status message is again lost.

At T7, the RetryTimer for Node A expires. Node A sends PW status request message C including LocalID=1234, RemoteID=0, and Req=T. Also, the RetryTimer is set to 3 and started. In this example the PW status message is again lost.

At T10, the RetryTimer for Node A expires. In this case, TimeoutMultiplier is set to 3, so because this is the third attempt to receive a status update from Node B, Node A goes into the UnknownSleeping state, sets the RequestTimer to 20, and starts the RequestTimer. In this example, TimeoutMultiplier is set to 3, but it may also be set to other values as well.

At T10, the RequestTimer for Node B expires. Node B sends PW status request message D including LocalID=5678, RemoteID=0, and Req=T. Node B also sets LastReqID to 5678 and enters the UnknownRefreshing state. Also, the RetryTimer is set to 3 and started.

At T11, Node B has a local PW status change and updates its LocalID to 5679. Node B sends PW status request message E including LocalID=5679, RemoteID=0, and Req=F. In this case Req may be set to F because Node B is reporting its own status change and does not require an update from Node A, especially as PW status request message D was just sent. In other embodiments, Req could be set to T, especially if there is no currently pending PW status request message.

At T12, Node A processes PW status message D. Node A sets RemoteID to 5678. In response and because Node B requested a PW status update, Node A sends a PW status message including LocalID=1234, RemoteID=5678, and Req=T. Also, the RequestTimer may be reset and restarted.

At T13, Node A processes PW status message E. Node A sets RemoteID to 5679. Because Req=F in PW status update message E, Node A does not send a PW status message. Also, the RequestTimer may be reset and restarted.

At T13, Node B processes PW status message F. RemoteID is set to 1234. Also, Node B enters the ActiveSleeping state. In response and because Node A requested a PW status update, Node B sends a PW status message G including LocalID=5679, RemoteID=1234, and Req=F. Also, the RequestTimer is reset and restarted.

At T14, Node A processes PW status message G. Node A enters the ActiveSleeping state. Because Req=F in PW status update message G, Node A does not send a PW status message. Also, the RequestTimer may be reset and restarted.

At T34, the RequestTimer for Node A expires. Node A sends PW status request message H including LocalID=1234, RemoteID=5879, and Req=T. Node A also sets LastReqID=1234 and enters the ActiveRefreshing state. Also, the RetryTimer is set to 3 and started.

At T34, Node B processes PW status message H. The RemoteID is set to 1234. Also, Node B remains in the ActiveSleeping state. In response and because Node A requested a PW status update, Node B sends a PW status message including LocalID=5679, RemoteID=1234, and Req=F. Also, the RequestTimer is reset and restarted.

At T34, Node A also processes PW status message I. Node A enters the ActiveSleeping state. Because Req=F in PW status update message G, Node A does not send a PW status message. Also, the RequestTimer may be reset and restarted.

The message exchange illustrated in FIG. 4 provides examples of the operation of PW nodes in various situations. Other situations and responses may arise as well. The number of times a PW request message is sent without receiving a response may be varied. Also, the timer values may be varied as desired and needed by a system user. The example of FIG. 4 is meant to be illustrative of embodiments and not limiting.

Figure 5:
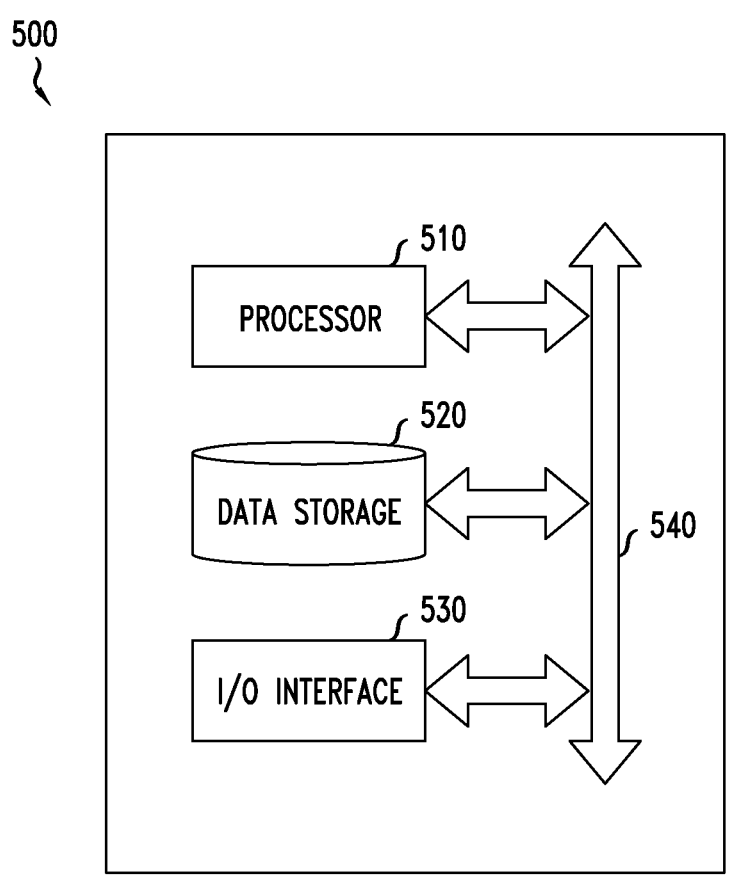
FIG. 5 illustrates a hardware diagram of an exemplary PW node.

FIG. 5 illustrates a hardware diagram of an exemplary PW node. A PW node is any network node connected to a PW. The exemplary PW node 500 may correspond to the exemplary Nodes A-D of FIG. 2 or Node A or Node B of FIG. 4. The PW node 500 may include a processor 510, a data storage 520, an input/output (I/O) interface 530, and system bus 540.

In some embodiments, the processor 510 may include resources such as processors/CPU cores, the I/O interface 530 may include any suitable network interfaces, or the data storage 520 may include memory or storage devices. Moreover the PW node 500 may be any suitable physical hardware configuration such as: one or more servers or blades consisting of components such as processor, memory, network interfaces or storage devices.

The data storage 520 and the processor 510 may reside in two different physical machines. In some embodiments, the PW node 500 may be a general purpose computer programmed to perform the methods described herein. When processor-executable programs are implemented on a processor 510, for example, programs that perform the methods described herein, the program code segments combine with the processor 510 to provide a unique device that operates analogously to specific logic circuits.

In various methods described and/or recited in this application, various steps of methods may be performed in a sequential manner, a parallel manner, or in a partially parallel manner.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for determining peer status in a pseudowire (PW) node, the method comprising:
   sending a first PW status request message to a peer node including a PW node local message ID, PW node remote message ID, and request flag;
   starting a first retry timer, wherein a retry timer determines the interval at which PW status messages are sent;
   starting a second retry timer when the first retry timer expires and no response to the first PW status request message is received;
   starting a first request timer when the second retry timer expires and no response to the first PW status request message is received, wherein a request timer is one which determines the timeout interval if no response to a PW status request message is received; and
   starting a third retry timer when the first request timer expires and no response to the first PW status request message is received.

2. The method of claim 1, further comprising setting a PW node last request ID to the PW node local message ID when the first PW status request message is sent.

3. The method of claim 1, further comprising initializing the PW node including randomly selecting the PW node local message ID, setting the PW node to an initial state, and starting a second request timer, wherein sending a first PW status request message to a peer node occurs after the second request timer expires.

4. The method of claim 3, wherein the length of the second request timer is randomly selected.

5. The method of claim 1, further comprising:
receiving a response to the first PW status request message from the peer node;
updating the PW node remote message ID with a peer node local message ID received in the response to the first PW status request message; and
updating a status of the PW node.

6. The method of claim 5, further comprising restarting the first request timer.

7. The method of claim 5, further comprising sending a second PW status request message to the peer node, if requested by the peer node, including the PW node local message ID, PW node remote message ID, and request flag.

8. The method of claim 7, wherein the request flag is false.

9. A pseudowire (PW) node comprising:
a network interface;
a memory; and
a processor in communication with the memory, the processor being configured to:
send a first PW status request message to a peer node including a PW node local message ID, PW node remote message ID, and request flag;
start a first retry timer, wherein a retry timer determines the interval at which PW status messages are sent;
start a second retry timer when the first retry timer expires and no response to the first PW status request message is received;
start a first request timer when the second retry timer expires and no response to the first PW status request message is received, wherein a request timer is one which determines the timeout interval if no response to a PW status request message is received; and
start a third retry timer when the first request timer expires and no response to the first PW status request message is received.

10. The PW node of claim 9, wherein the processor is further configured to set a PW node last request ID to the PW node local message ID when the first PW status message is sent.

11. The PW node of claim 9, wherein the processor is further configured to initialize the PW node including randomly selecting the PW node local message ID, setting the PW node to an initial state, and starting a second request timer, wherein sending a first PW status request message to a peer node occurs after the second request timer expires.

12. The PW node of claim 11, wherein the length of the second request timer is randomly selected.

13. The PW node of claim 9, wherein the processor is further configured to:
receive a response to the first PW status request message from the peer node;
update the PW node remote message ID with a peer node local message ID received in the response to the first PW status request message; and
update a status of the PW node.

14. The PW node of claim 13, wherein the processor is further configured to restart the first request timer.

15. The PW node of claim 13, wherein the processor is further configured to send a second PW status request message to the peer node, if requested by the peer node, including the PW node local message ID, PW node remote message ID, and request flag.

16. The PW node of claim 13, wherein the request flag is false.

* * * * *